United States Patent Office 3,133,612
Patented May 19, 1964

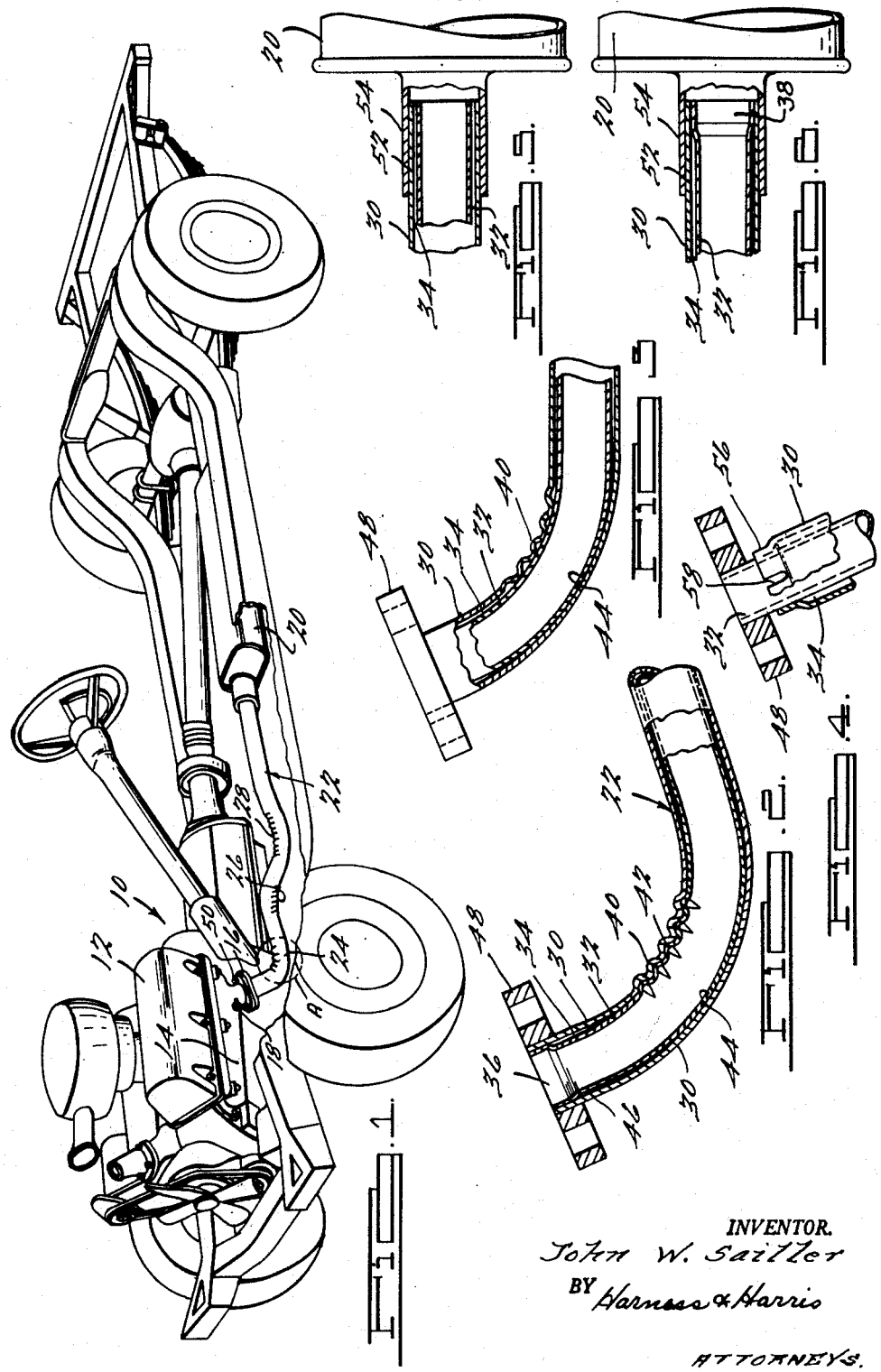

3,133,612
SOUND DEADENING LAMINATED ENGINE
EXHAUST PIPE
John W. Sailler, Royal Oak, Mich., assignor to Chrysler
Corporation, Highland Park, Mich., a corporation of
Delaware
Filed July 6, 1960, Ser. No. 41,121
17 Claims. (Cl. 181—36)

This invention relates to an engine exhaust pipe which connects the exhaust manifold of an engine with the exhaust muffler of a vehicle. It particularly relates to an exhaust pipe comprising a laminated tubular construction of loosely interfitting but substantially rattle-free pipes adapted to dampen or render quiescent the noises or sounds produced in the exhaust pipe of an internal combustion engine and caused by the explosion of gases in the engine cylinders.

Engine exhaust pipes have heretofore been customarily made of a length of steel tubing provided with a flange connection at one end to be joined with the exhaust manifold of the engine generally below the heat valve thereof, and with a generally free opposite end which would connect with a projecting sleeve of the conventional exhaust muffler. These exhaust pipes have been of a single thickness of metal. In operation of the engine, the noises resulting from the explosion of the air-fuel mixture charge in the engine cylinders is transmitted through the exhaust pipe to the muffler. These sounds are generally quite audible at the exhaust pipe and in the passenger compartment of the vehicle by reason of the close proximity of the exhaust pipe thereto. Moreover, the exhaust pipe gets quite hot during engine operation and at high speeds is apt to become white hot thereby aso transmitting considerable heat to the surrounding ambient air. During cooling the air has a deteriorating and oxidizing effect upon the pipe.

I have discovered that the aforesaid noises emanating from the exhaust pipe may be substantially inhibited or substantially reduced by making the exhaust pipe of the engine of a laminated construction wherein a dead air space, preferably of continuous character, is provided between the laminations of the pipe. Usually a relatively thin air space of between $\frac{1}{64}''$ to $\frac{1}{32}''$ between the inner and outer walls of the pipe will suffice to provide the new result, but I do not limit myself thereto. I have found that this construction not only serves to deaden sound transmission to the ambient air but also adds materially to the life of the exhaust pipe, since the outer lamination to a large degree is believed to protect the white hot inner wall of the pipe from oxidation effects. Moreover, because of the character of construction hereinafter described, there is no rattle between the inner and outer walls of the pipe when installed and operating on a vehicle.

Accordingly, it is a principal object of my invention to provide an exhaust pipe construction for connecting the exhaust manifold of an engine with the muffler of a vehicle, which pipe construction comprises a pair of tubular members, one within the other, so as to loosely telescope with each other, providing a laminated construction wherein the inner tube is so supported relative to the outer tube that it has its wall spaced from the outer wall by a thin air space serving to insulate sound transmission between the tubular sections and effecting a damping of the noises produced in the transmission of exhaust gases through the exhaust pipe and which are audible in the passenger compartment of a vehicle.

Another object is to provide a tubular laminated exhaust pipe construction in which the laminae are held in spaced relation by one or more surface deformations on one or both thereof.

A further object is to provide a laminated exhaust pipe construction having an air space between the laminae thereof and wherein the laminae are held in spaced relation by a crimp, wrinkle, or undulation, preferably a plurality thereof, provided at least upon the wall of the external lamina.

A further object is to provide constructions as in the previous objects wherein the laminae are tightly held in spaced relation in such manner as to render the construction substantially rattle free.

A specific object is to provide a laminated exhaust pipe construction comprising a pair of loosely interfitted or telescoping tubes formed longitudinally with a plurality of spaced curved or bent sections to adapt it for installation in a vehicle, and wherein the curved sections are crimped at their inner sides to produce a construction wherein the tubes are relatively immovable and free of rattle and wherein the tubes are held in radially spaced relationship between bends so as to provide a substantial continuous air space between such bends longitudinally of the pipe.

Another object is to provide an exhaust pipe as set forth in the previous objects wherein the air space between the pipe laminations is closed at least at one end of the pipe construction.

Other objects and advantages of my invention will appear from the following description and from the drawings wherein:

FIGURE 1 is a view in perspective of the engine and chassis of a vehicle showing the exhaust pipe of my invention connecting the exhaust manifold of the engine with the vehicle muffler;

FIGURE 2 shows an enlarged sectional view of the circled portion A in FIGURE 1 of the exhaust pipe of my invention showing one type of crimp between the inner and outer tubular elements, this view also showing in section one manner of providing a flange type construction for connecting the exhaust pipe with the exhaust manifold of the engine and an arrangement for closing the air space between the tubular elements;

FIGURE 3 is a sectional view taken similarly to FIGURE 2 showing a modification of the form of crimp for holding the laminated tubular elements together;

FIGURE 4 shows a modification of the flange construction of FIGURES 2 and 3 illustrating an alternate mode of closing the air space between the tubular elements at the flange connection and wherein the flange connection is made to the inner tube rather than the outer tube as in FIGURES 2 and 3; and FIGURES 5 and 6 illustrate two forms of construction of the connection between the discharge end of the exhaust pipe and the muffler extension pipe which may be applied to the exhaust pipe constructions of FIGURES 1–4.

Referring now to FIGURE 1, my invention is there shown applied to an automotive vehicle generally designated by the numeral 10 provided with an engine 12 the exhaust manifold 14 of which has a flanged discharge end 16 and a heat valve 18 located upstream of this end and a muffler 20 for receiving exhaust gas from the engine. The exhaust pipe of my invention generally designated by the numeral 22 interconnects the exhaust manifold 14 and the muffler 20. The pipe 22 is provided with a series of bends 24, 26, 28 made necessary in going around intervening parts of the automotive chassis structure in making this connection.

The exhaust pipe 22, as seen in FIGURES 2 to 6 inclusive, is made up of two loosely telescoping or interfitting outer and inner metallic tubes 30, 32 preferably of circular section, and preferably made from mild steel for purposes of cost and adaptability to be bent but which may also, one or both, be made from a more oxidation resistant metal such as a stainless steel or other chrome-nickel alloy. Moreover, the tubes 30 and 32 may, prior to assembly, be aluminized by dipping or spraying to make them more oxidation resistant. The tubes 30, 32 in initial assembly are of loosely interfitting character with the inner tube 32 preferably of an outside diameter between 1/32" to 1/16" less than the inside diameter of the tube 30 so that a relatively thin air space 34 may be provided between the tubes 30 and 32 which except for nodal contact points between the tubes as hereinafter described, will be a continuous air space the full length of the exhaust pipe 22. It will be understood that the air space may vary considerably in dimension over the length of the pipe without materially affecting the advantageous results obtainable thereby.

According to one mode of producing the exhaust pipe of my invention, a straight length of pipe of requisite length of each size are brought into telescoping relationship with the ends flush with each other and the inner tube 32 will have its opposite end portions 36, 38 respectively expanded as in FIGURES 2 and 6 to close the air space between the air tubes 30, 32 and in this manner also locate the wall portion of the inner tube 32 in spaced relation with the wall of the outer tube 30 to provide an air space therebetween. The exhaust pipe 22 with its ends thus formed is then bent by means of a conventional exhaust pipe bending brake to the proximate shape shown in FIGURE 1 to provide the series of bends 24, 26, 28 there illustrated necessary for effecting installation of the exhaust pipe 22 between the exhaust manifold 14 and muffler 20. In making these bends, the outer side of the bend of each tube will preferably remain smooth and the inner side of the bend of each tube may be, for example, deformed as shown in FIGURE 2 to form a crimp or wrinkle comprising interfitting undulated portions 40, 42 on the tubes 30 and 32 respectively, each composed of a plurality of peaks and valleys. In effecting this crimp, the outer side 44 of tube 32 will at the bend usually contact the inner wall of the tube 30 in this nodal area. The double crimp 40, 42 will be preferably effected at each of the bends 24, 26 and 28 of the exhaust pipe and these will further serve to maintain the air space between the telescoped tubes 30 and 32 and prevent relative longitudinal or transverse movement between them such as might produce rattle following installation of the exhaust pipe on a vehicle.

As seen in FIGURE 2, the outer end 46 of the tube 30 is provided with a flange 48 which may be secured to the flanged end 16 of the exhaust manifold of the engine in any suitable manner as by bolts 50 so as to connect the exhaust pipe 22 with the exhaust manifold 14. Moreover, the opposite end 52 of this tube forms a sliding relatively tight fit with a sleeve 54 on the muffler 20.

Where desired, the crimp at the bends 24, 26, and 28 of the exhaust pipe may be of a modified construction as shown in FIGURE 3 wherein only the outer tube 30 is provided with the crimp 40 for effecting spacing of the tubes as well as a sufficient bind between the tubes at the opposite walls to prevent relative movement between them. This character of construction will be used only when there is a substantial spacing between the tubes, that is to say, the tube 32 is much smaller in section than the tube 30.

It will also be noted that with crimps at bends 24, 26, and 28 such will occur at opposite surface portions of the pipe 22 and that such aids in maintaining the spacing between the tubes 30 and 32 and the tight relationship between them. The use of a plurality of crimps in this manner on each pipe is preferred.

Where multiple crimps are provided over the length of the exhaust pipe 22 as seen in FIGURE 1, the expanded portion 38 of the inner tube 32 at the muffler end of the exhaust pipe may be omitted and this portion left free as in FIGURE 5, in which case the air space 34 at this end of the pipe is open. Moreover, the flange 48 for connecting the pipe 22 with the exhaust manifold discharge pipe flange 16 may be mounted on the tube 32 as in FIGURE 4, instead of on the tube 30 in which case the outer tube 30 will be compressed as at 56 against the inner tube 32 to close the air space 34 between the tubes. This compressed portion may be provided with a plurality of slits 58 to facilitate the reduction in diameter and also to provide areas wherein the outer tube may be spot welded at this point to the inner tube of the construction.

It will be understood that the crimping at locations 24, 26, and 28 need not all be symmetrical, that is to say, all of the type in either FIGURE 2 or 3, but some may be of one type and the remainder of the other. Moreover, as already described, the end connections of the exhaust pipe may be of any of the forms shown and in any combination.

From the foregoing description of my invention, it will be apparent that I have provided a novel exhaust pipe construction made up of two interlocked loosely telescoped tubes provided with an air space for materially reducing or damping the exhaust system sounds that are transmitted through the exhaust pipe during operation of an engine. It will be understood that various modifications and changes will suggest themselves to those skilled in the art without departing from the novel features described above. All such modifications and changes are therefore contemplated as may come within the purview of the appended claims.

I claim:

1. An exhaust pipe for conveying exhaust gases from the exhaust manifold of an internal combustion engine to a muffler therefor comprising an inner metallic tube, an outer metallic tube surrounding said inner tube and having its wall spaced from the wall of said inner tube to provide a surrounding sound deadening air space therebetween dormant during conveyance of said gases and extending substantially continuously over the major length of said pipe, and a crimp in said pipe spaced from one end thereof comprising a plurality of deformations in the wall of at least one of said tubes in pressure contact with the wall of the other tube to effectuate said spacing and inhibit rattle producing relative movement between said tubes, said deformations extending transversely of said wall of said one tube over a partial peripheral distance only thereof.

2. An exhaust pipe for conveying exhaust gases from the exhaust manifold of an internal combustion engine to a muffler therefor comprising an inner metallic tube, an outer metallic tube surrounding said inner tube and having its wall spaced from the wall of said inner tube to provide a surrounding sound deadening air space therebetween dormant during conveyance of said gases and extending substantially continuously over the major length of said pipe, and a crimp in said pipe spaced from one end thereof comprising a plurality of undulations in the wall of said outer tube and in pressure contact with the wall of the inner tube said undulations extending transversely of said wall over a partial peripheral distance only thereof.

3. An exhaust pipe for conveying exhaust gases from the exhaust manifold of an internal combustion engine to a muffler therefor comprising an inner metallic tube, an outer metallic tube surrounding said inner tube and having its wall spaced from the wall of said inner tube to provide a surrounding sound deadening air space therebetween dormant during conveyance of said gases and extending substantially continuously over the major length of said pipe, and a crimp in said pipe spaced from one end thereof comprising a plurality of undulations in the walls of said inner and outer tubes, said undulations of one tube nesting in the undulations of the other tube and effecting a pressure contact between the walls of said tubes at said crimp and said undulations extending transversely of said walls over a partial peripheral distance only thereof.

4. An exhaust pipe for conveying exhaust gases from the exhaust manifold of an internal combustion engine to a muffler therefor comprising an inner metallic tube, an outer metallic tube surrounding said inner tube and having its wall spaced from the wall of said inner tube to provide a surrounding sound deadening air space therebetween dormant during conveyance of said gases and extending substantially continuously over the major length of said pipe, and a crimp in said pipe spaced from one end thereof comprising a plurality of undulations in the walls of said inner and outer tubes, said undulations of one tube nesting in the undulations of the other tube and effecting a pressure contact between the walls of said tubes at said crimp and between the walls of said tubes immediately opposite said crimp and said undulations extending transversely of said walls over a partial peripheral distance only thereof.

5. An exhaust pipe for conveying exhaust gases from the exhaust manifold of an internal combustion engine to a muffler therefor comprising an inner metallic tube, an outer metallic tube surrounding said inner tube and having its wall spaced from the wall of said inner tube to provide a surrounding sound deadening air space therebetween dormant during conveyance of said gases, and a plurality of crimps spaced apart longitudinally of said pipe, each said crimp comprising a plurality of undulations in the wall of said outer tube and in pressure contact with the wall of the other tube said undulations extending transversely of said outer wall over a partial peripheral distance only thereof.

6. An exhaust pipe as claimed in claim 5 wherein at least one of said spaced crimps is at a different angular position circumferentially of the pipe from the others.

7. An exhaust pipe for conveying exhaust gases from the exhaust manifold of an internal combustion engine to a muffler therefor comprising an inner metallic tube, an outer metallic tube surrounding said inner tube and having its wall spaced from the wall of said inner tube to provide a surrounding sound deadening air space therebetween dormant during conveyance of said gases, and a plurality of bends in said pipe, each of said bends having a crimp on the inner side thereof, each crimp comprising a plurality of transverse undulations in the wall of said outer tube and in pressure contact with the wall of the inner tube said undulations extending over a partial peripheral distance only of said wall.

8. An exhaust pipe for conveying exhaust gases from the exhaust manifold of an internal combustion engine to a muffler therefor comprising an inner metallic tube, an outer metallic tube surrounding said inner tube and having its wall spaced from the wall of said inner tube to provide a surrounding sound deadening air space therebetween dormant during conveyance of said gases and extending substantially continuously over the major length of said pipe, and an enlarged portion at the opposite ends of said inner tube internally in pressure contact with the outer tube.

9. An exhaust pipe for conveying exhaust gases from the exhaust manifold of an internal combustion engine to a muffler therefor comprising an inner metallic tube, an outer metallic tube surrounding said inner tube and having its wall spaced from the wall of said inner tube to provide a surrounding sound deadening air space therebetween dormant during conveyance of said gases, an enlarged portion at one end of said inner tube internally in pressure contact with the same end of said outer tube and a crimp in said pipe spaced from said one end comprising a plurality of undulations in the wall of said outer tube in pressure contact with the wall of said inner tube.

10. An exhaust pipe as claimed in claim 9 wherein the space between said tubes at the end of said pipe opposite said one end of said inner tube is open.

11. An exhaust pipe as claimed in claim 5 wherein the longitudinal opposite ends of the walls of said inner and outer tubes are in pressure contact with each other so as to close the air space between said tubes.

12. An exhaust pipe for conveying exhaust gases from the exhaust manifold of an internal combustion engine to a muffler therefor comprising an inner metallic tube, an outer metallic tube surrounding said inner tube and having its wall spaced from the wall of said inner tube to provide a surrounding sound deadening air space therebetween dormant during conveyance of said gases, a coupling flange at one end of said outer tube, the other end thereof being free, an expanded portion on each end of said inner tube in pressure contact internally with the wall of the outer tube at such ends and a crimp in said pipe spaced from said flanged end of said outer tube, said crimp comprising a plurality of undulations in the wall of said outer tube in pressure contact with the wall of said inner tube.

13. An exhaust pipe as claimed in claim 12 wherein said pipe has a plurality of bends and there is a crimp at the inner side of each bend.

14. An exhaust pipe as claimed in claim 13 wherein each crimp comprises a plurality of convolutions in the walls of said inner and outer tubes with the undulations of one tube nesting with the undulations of the other at such crimp.

15. An exhaust pipe for conveying exhaust gases from the exhaust manifold of an internal combustion engine to a muffler therefor comprising an inner metallic tube, an outer metallic tube surrounding said inner tube and having its wall spaced from the wall of said inner tube to provide a surrounding sound deadening air space therebetween dormant during conveyance of said gases, a coupling flange at one end of said inner tube, a compressed portion on said outer tube in pressure relation with said inner tube adjacent said flange, an expanded wall portion on said inner tube at the end of said pipe opposite said flange and in pressure relationship with the wall of said outer tube, and a crimp in said pipe spaced from said flanged end of said inner tube, said crimp comprising a plurality of undulations in the wall of said outer tube in pressure contact with the wall of said inner tube.

16. An exhaust pipe for conveying exhaust gases from the exhaust manifold of an internal combustion engine to a muffler therefor comprising an inner metallic tube, an outer metallic tube surrounding said inner tube and having its wall spaced from the wall of said inner tube to provide a surrounding sound deadening air space therebetween dormant during conveyance of said gases, a coupling flange at one end of said inner tube, a compressed portion on said outer tube in pressure relation with said inner tube adjacent said flange, and a crimp in said pipe spaced from said flanged end of said inner tube, said crimp comprising a plurality of undulations in the wall of said outer tube in pressure contact with the wall of said inner tube.

17. In an automotive vehicle including a driver compartment, an internal combustion engine having an exhaust gas manifold to which the hot gas residue of explosions of an air-fuel mixture charge in the engine cylinders is transmitted and which gases convey the audible sound waves of said explosions, a muffler for receiving said hot exhaust gases and suppressing said audible sound waves and exhaust pipe means for conducting said exhaust gases to said muffler and inhibiting external transmission of said sound waves, the improvement which consists in exhaust pipe means comprising an inner metallic tube providing a passage for said gases, an outer metallic tube surrounding said inner tube and having its wall spaced from the wall of said inner tube to provide a surrounding sound deadening air space therebetween extending longitudinally over the major length of said pipe means, and spaced groups of deformations in the wall of at least one of said tubes in pressure contact with the wall of the other tube to effectuate said spacing and inhibiting rattle producing relative movement between said tubes, said air space being substantially dormant during operation of said engine and said deformations extending transversely of said wall over a partial peripheral distance only thereof.

References Cited in the file of this patent

UNITED STATES PATENTS

| | | |
|---|---|---|
| 517,276 | Greenfield | Mar. 27, 1894 |
| 895,750 | Harms et al. | Aug. 11, 1908 |
| 2,039,781 | Debenedetti | May 5, 1936 |
| 2,259,433 | Kitto | Oct. 14, 1941 |
| 2,541,373 | McLeod | Feb. 13, 1951 |
| 2,661,073 | Dermer | Dec. 1, 1953 |
| 2,770,313 | Johnson | Nov. 13, 1956 |
| 3,043,094 | Nichols | July 10, 1962 |

FOREIGN PATENTS

| | | |
|---|---|---|
| 704,741 | France | Feb. 24, 1931 |
| 65,401 | France | Oct. 12, 1955 |
| 1,179,175 | France | Dec. 15, 1958 |
| 343,967 | Great Britain | Feb. 27, 1931 |
| 571,890 | Great Britain | Sept. 13, 1945 |